US008347933B2

(12) United States Patent
Narita

(10) Patent No.: US 8,347,933 B2
(45) Date of Patent: Jan. 8, 2013

(54) APPLICATION-FILM TRANSFER TOOL

(75) Inventor: Yasuo Narita, Tokyo (JP)

(73) Assignee: Plus Corporation, Tokyo (JP)

( * ) Notice: Subject to any disclaimer, the term of this patent is extended or adjusted under 35 U.S.C. 154(b) by 179 days.

(21) Appl. No.: 12/906,677

(22) Filed: Oct. 18, 2010

(65) Prior Publication Data

US 2011/0120659 A1 May 26, 2011

(30) Foreign Application Priority Data

Nov. 26, 2009 (JP) ................................ 2009-268657

(51) Int. Cl.
*B32B 37/16* (2006.01)
*B65H 37/04* (2006.01)

(52) U.S. Cl. ....................................... 156/577; 156/540

(58) Field of Classification Search .................. 156/577, 156/540; *B32B 37/16; B65H 37/04*
See application file for complete search history.

(56) References Cited

U.S. PATENT DOCUMENTS 6,500,259 B1 * 12/2002 Tamai et al. .................... 118/76
6,599,363 B2 * 7/2003 Narita ............................ 118/76
6,730,186 B2 * 5/2004 Takahashi ..................... 156/238
6,830,089 B1 * 12/2004 Tamai et al. .................. 156/577
7,275,578 B2 * 10/2007 Mitsui et al. .................. 156/523
2008/0083487 A1 * 4/2008 Moss et al. .................... 156/250

FOREIGN PATENT DOCUMENTS

JP 2002-205867 7/2002
JP 2003-103994 4/2003

* cited by examiner

*Primary Examiner* — Philip Tucker
*Assistant Examiner* — Shawn F Hogan
(74) *Attorney, Agent, or Firm* — Rodman & Rodman

(57) ABSTRACT

An application-film transfer tool includes a supply bobbin around which an unused transfer tape is wound; a transfer head around which the transfer tape is extended, the transfer head pressure-sensitively transferring an application film of the transfer tape onto a transfer subject by pressing against the transfer subject; a take-up bobbin taking up the used transfer tape; a clutch mechanism transmitting the rotation of the supply bobbin to the take-up bobbin and controlling the rotational speed of the take-up bobbin; and a reverse-rotation prevention mechanism preventing reverse rotation of the supply bobbin, wherein part of the supply bobbin constitutes part of the reverse-rotation prevention mechanism.

5 Claims, 7 Drawing Sheets

(a)

(b)

APPLICATION-FILM TRANSFER TOOL

BACKGROUND OF THE INVENTION

1. Field of the Invention

The present invention relates to an application-film transfer tool including a clutch mechanism and a reverse-rotation prevention mechanism and, more specifically, relates to an application-film transfer tool in which part of a supply bobbin constitutes part of the reverse-rotation prevention.

2. Description of the Related Art

Various application-film transfer tools that are used for applying glue or correcting characters have been proposed in the past. Such application-film transfer tools have a case accommodating a supply bobbin around which unused transfer tape is wound, a take-up bobbin that takes up used transfer tape from the supply bobbin, and interlocking means for interlocking the supply bobbin and the take-up bobbin. The transfer tape used by such an application-film transfer tool is constituted of a base tape, which is a conveying medium, made of resin tape or paper tape, and an application film that easily peels off the surface of the base tape.

With such an application-film transfer tool, the application film for the transfer tape can be transferred onto a transfer subject by extending the transfer tape around a transfer head protruding from the case, closely contacting the transfer head with the transfer subject, such as paper, and moving the case while pressing the transfer head against the transfer subject. At the same time, the transfer tape is reeled out from the supply bobbin, and the used transfer tape (base tape) is taken up by the take-up bobbin.

With such an application-film transfer tool, transfer might fail when the transfer tape sags. Therefore, the rotational speed of the take-up bobbin is set greater than the rotational speed of the supply bobbin so that tension of the transfer tape is constantly maintained above a predetermined value. As the application-film transfer tool is used, the amount of the transfer tape wound around the supply bobbin decreases, and the amount of the base tape wound around the take-up bobbin increases. Consequently, the amount of base tape taken up by one rotation of the take-up bobbin increases each time the take-up bobbin rotates. As a result, the transfer load required for application film increases, and it becomes difficult to transfer the application film. Thus, the supply bobbin is over-rotated such that the rotation of the supply bobbin is not fully transmitted to the take-up bobbin. Usually, an application-film transfer tool has a clutch mechanism that absorbs the difference in the amounts of tape conveyed by the supply bobbin and the take-up bobbin and adjusts the tension in the transfer tape.

To transfer the application film of the transfer tape onto a transfer subject using the application-film transfer tool, the case is moved. However, when the case is moved in a direction opposite to the movement for transferring the application film, the transfer tape may sag and/or may become tangled inside the case. To prevent such problems, a typical application-film transfer tool includes a reverse-rotation prevention mechanism.

For example, Japanese Unexamined Patent Application Publication No. 2002-205867 proposes an application-film transfer tool including a clutch mechanism in which resilient arms (curved members), contacting the inner circumferential surface of a supply bobbin, are cantilevered at 120° intervals along the circumference of a rotary shaft of the supply bobbin on the outer circumference of the rotary shaft and a reverse-rotation prevention mechanism having a latching arm provided on a supply-side gear and teeth, which are latching grooves, provided on the inner surface of the case.

In Japanese Unexamined Patent Application Publication No. 2003-103994, the inventor proposes an application-film transfer tool that includes an easily-replaceable clutch mechanism slidable by including a clutch member with resilient arms provided on a rotary shaft in a circular depression formed in the upper surface of a supply-side gear and contacting projections provided at the ends of the resilient arms to the inner circumferential surface of the circular depression. A reverse-rotation prevention mechanism of such an application-film transfer tool may include, for example, a ratchet gear further provided on a gear part of a take-up bobbin and a latching arm provided on a flat plate of a case in such a manner that it engages with the ratchet gear. In this way, reverse rotation of a supply bobbin can be prevented.

SUMMARY OF THE INVENTION

When an application film of a transfer tape is transferred using an application-film transfer tool, a predetermined load should be applied to a transfer head to transfer the application film onto a transfer subject. With the application-film transfer tool described in Japanese Unexamined Patent Applications Publication Nos. 2002-205867 and 2003-103994, mechanical loss is generated at the reverse-rotation prevention mechanism in the driving transmission system. When the diameter of the winding core of the supply bobbin is large, the transfer load does not increase even when the frictional force of the clutch mechanism is great, and thus, the usability of the application-film transfer tool is not reduced.

Nowadays, there is a need in reducing the diameter of the winding core due to a decrease in the size of products. However, when the diameter of the winding core is decreased to reduce the size of the application-film transfer tool, the transfer load applied to the supply bobbin by the frictional force of the clutch mechanism and/or the reverse-rotation prevention mechanism increases. Therefore, when the diameter of the winding core is decreased, problems such as the supply bobbin not smoothly rotating due to mechanical loss at the clutch mechanism and the reverse-rotation prevention mechanism occur.

As the application-film transfer tool described in Japanese Unexamined Patent Applications Publication Nos. 2002-205867 and 2003-103994, by providing the reverse-rotation prevention mechanism near the supply-side gear and the take-up bobbin and the clutch mechanism between the reverse-rotation prevention mechanism and the supply bobbin, skid resistance of the clutch mechanism, which transmits normal rotation to the take-up bobbin via the reverse-rotation prevention mechanism, should be increased. In such a case, the rotational resistance of the supply bobbin due to resistance by the clutch mechanism increases, and, thus, rotating the supply bobbin may become difficult.

Therefore, to prevent the transfer load from increasing, the frictional force of the clutch mechanism and/or the reverse-rotation prevention mechanism should be decreased. However, when the diameter of the winding core, as well as the skid resistance of the clutch mechanism, is decreased, the take-up bobbin does not rotate because normal rotation is not transmitted to the take-up bobbin via the clutch mechanism because the clutch mechanism over-rotates due to a small amount of mechanical loss. As a result, take-up of used tape may fail.

There present invention was conceived in light of the problems described above and provides a small application-film transfer tool that eliminates mechanical loss in a driving transmission system caused by providing a reverse-rotation prevention mechanism on a supply-side gear and the take-up bobbin and that reliably rotates a take-up bobbin by transmitting a driving force, even when the frictional force of a clutch mechanism is reduced.

An application-film transfer tool according to the present invention includes a supply bobbin around which an unused transfer tape is wound; a transfer head around which the transfer tape is extended, the transfer head pressure-sensitively transferring an application film of the transfer tape onto a transfer subject by pressing against the transfer subject; a take-up bobbin taking up the used transfer tape; a clutch mechanism transmitting the rotation of the supply bobbin to the take-up bobbin and controlling the rotational speed of the take-up bobbin; and a reverse-rotation prevention mechanism preventing reverse rotation of the supply bobbin, wherein part of the supply bobbin constitutes part of the reverse-rotation prevention mechanism.

In the application-film transfer tool, the supply bobbin, the transfer head, and the take-up bobbin may be accommodated in a refill case that attaches to and detaches from a main body, and the reverse-rotation prevention mechanism may be accommodated in the refill case.

In the application-film transfer tool, the reverse-rotation prevention mechanism may include a plurality of latching grooves provided along the circumference of the supply bobbin and a resilient deformable latching arm provided on the refill case.

In the application-film transfer tool, the main body to and from which the refill case is attached and detached may include the clutch mechanism, a supply-side gear receiving a rotational force of the supply bobbin via the clutch mechanism, a take-up-side gear transmitting the rotational force to the take-up bobbin, and a base member having interlocking means for interlocking the supply-side gear and the take-up-side gear.

The present invention provides a small application-film transfer tool that eliminates mechanical loss of the driving transmission system caused by providing a reverse-rotation prevention mechanism on the supply-side gear and the take-up-side gear and that reliably rotates the take-up bobbin by transmitting a driving force even when the frictional force of the clutch mechanism is small.

Since the reverse-rotation prevention mechanism is provided inside the refill case, the reverse-rotation prevention mechanism is also replaced when the transfer tape is replaced. In this way, an application-film transfer tool in which the main body can be used for a long period of time is provided.

DESCRIPTION OF THE PREFERRED EMBODIMENTS

Figure 1:
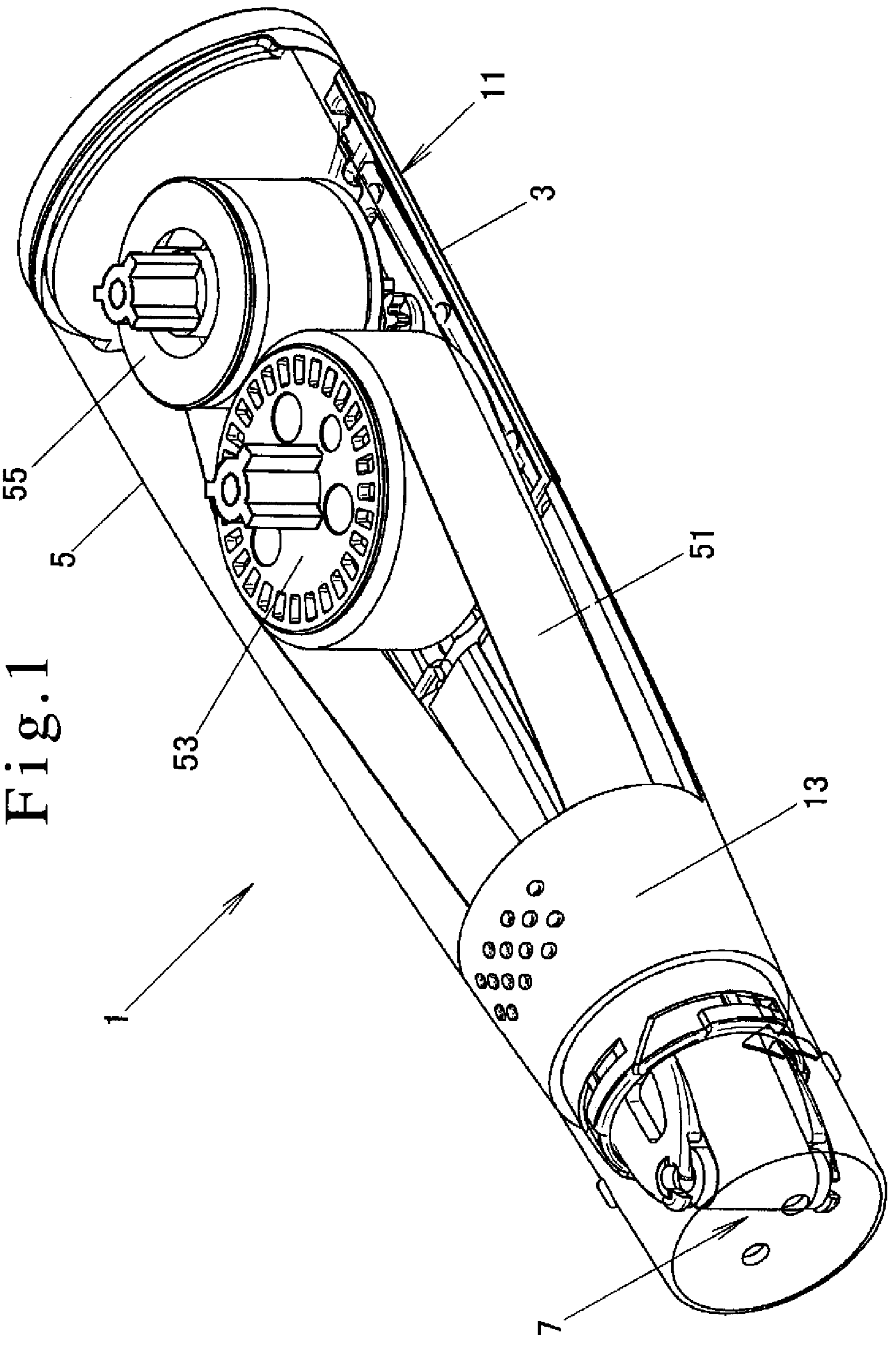
FIG. 1 is a perspective view illustrating an application-film transfer tool according to an embodiment of the present invention.

An embodiment of the present invention will be described below. An application-film transfer tool 1 includes a refill 5 and a main body 3 holding the refill 5. The refill 5 includes a refill case attachable to and detachable from the main body 3, a supply bobbin 53 accommodated in the refill case, a transfer head 7, a take-up bobbin 55, and a transfer tape 51.

The unused transfer tape 51 is wound around the supply bobbin 53. The transfer tape 51 is extended around the transfer head 7, and the application film of the transfer tape 51 is pressure-sensitively transferred onto a transfer subject by pressing the transfer head 7 against the transfer subject. The take-up bobbin 55 takes up the used transfer tape 51 (base tape).

The main body 3 includes a base member 11, which has a back securing member 31 holding the back section of the refill 5, and a front securing member 13 holding the front section of the refill 5. On the base member 11, a clutch mechanism, a supply-side gear 26 that receives the rotational force of the supply bobbin 53 via the clutch mechanism, a take-up-side gear 28 that transfers the rotational force to the take-up bobbin 55, and an intermediate flat gears 27 functioning as interlocking means for interlocking the supply-side gear 26 and the take-up-side gear 28. The clutch mechanism includes a clutching member 29 and the supply-side gear 26 and functions as a friction clutch in which projections provided at the tips of resilient arms 29*a* contact the inner circumferential surface of a circular depression 26*a*. In this way, the clutch mechanism transmits the rotation of the supply bobbin 53 to the take-up bobbin 55 and controls the rotational speed of the take-up bobbin 55.

On the application-film transfer tool 1, the refill 5 can be loaded at a predetermined position on the main body 3 and secured by the front securing member 13 and the back securing member 31 of the base member 11 through separating the base member 11 of the main body 3 and the front securing member 13, placing the refill 3 on the base member 11, and, in this state, closely connecting the base member 11 of the main body 3 and the front securing member 13.

A reverse-rotation prevention mechanism that prevents reverse rotation of the supply bobbin 53 is accommodated in the refill case of the application-film transfer tool. The reverse-rotation prevention mechanism includes a plurality of latching grooves 53*a* provided along the circumference of the supply bobbin. 53 and a resilient deformable latching arm 71*e* provided on the refill ease. In other words, part of the supply bobbin 53 constitutes part of the reverse-rotation prevention mechanism.

Embodiment

Figure 2:
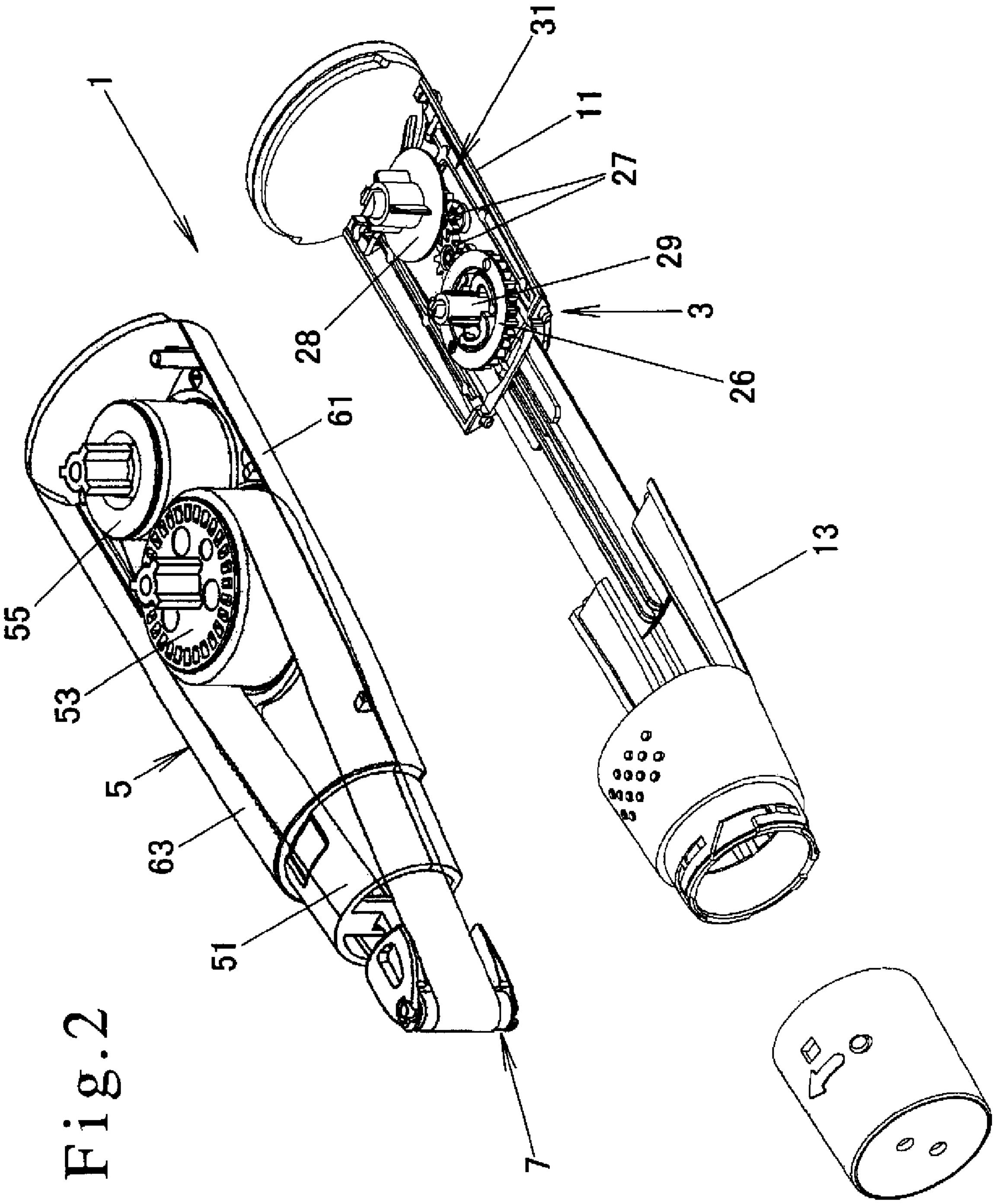
FIG. 2 is a perspective view illustrating a refill and a main body of the application-film transfer tool according to an embodiment of the present invention in a separated state.

The application-film transfer tool 1 according to the present invention will be described in detail below with reference to the drawings. FIG. 1 is an external perspective view illustrating the application-film transfer tool 1 according to this embodiment. FIG. 2 is a perspective view illustrating the refill 5 and the main body 3 in a separated state. In this specification, as illustrated in FIG. 1, "front" refers to the area where the transfer head 7 of the application-film transfer tool 1 is positioned; "back" refers to the area where the base member 11 of the main body 3 is positioned; "top" refers to the area where the refill 5 is positioned; "bottom" refers to the area where the main body 3 is positioned; and "traverse direction" refers to the direction orthogonal with the forward, backward, upward, and downward directions.

The application-film transfer tool 1 according to this embodiment is capable of pressure-sensitively transferring an application film of the transfer tape 51, which is formed by applying the application film onto a base tape, onto a transfer subject by sliding the transfer head 7 on the transfer subject, such as paper, while the transfer head 7 is pressed against the transfer subject. As illustrated in FIGS. 1 and 2, the application-film transfer tool 1 includes the refill 5 and the main body 3 holding the refill 5.

The application-film transfer tool 1, which is an integrated unit of the main body 3 and the refill 5, constitutes a driving transmission system including the supply bobbin 53 that rotates by the transfer tape 51 being reeled out, the clutching member 29 that rotates by interlocking with the supply bobbin 53, the supply-side gear 26 that rotates by the frictional force of the clutching member 29, the intermediate flat gears 27 that engage with the supply-side gear 26, the take-up-side gear 28 that receives the rotational force of the supply-side gear 26 via the intermediate flat gears 27, and the take-up bobbin 55 that rotates by interlocking with the take-up-side gear 28.

Figure 3:
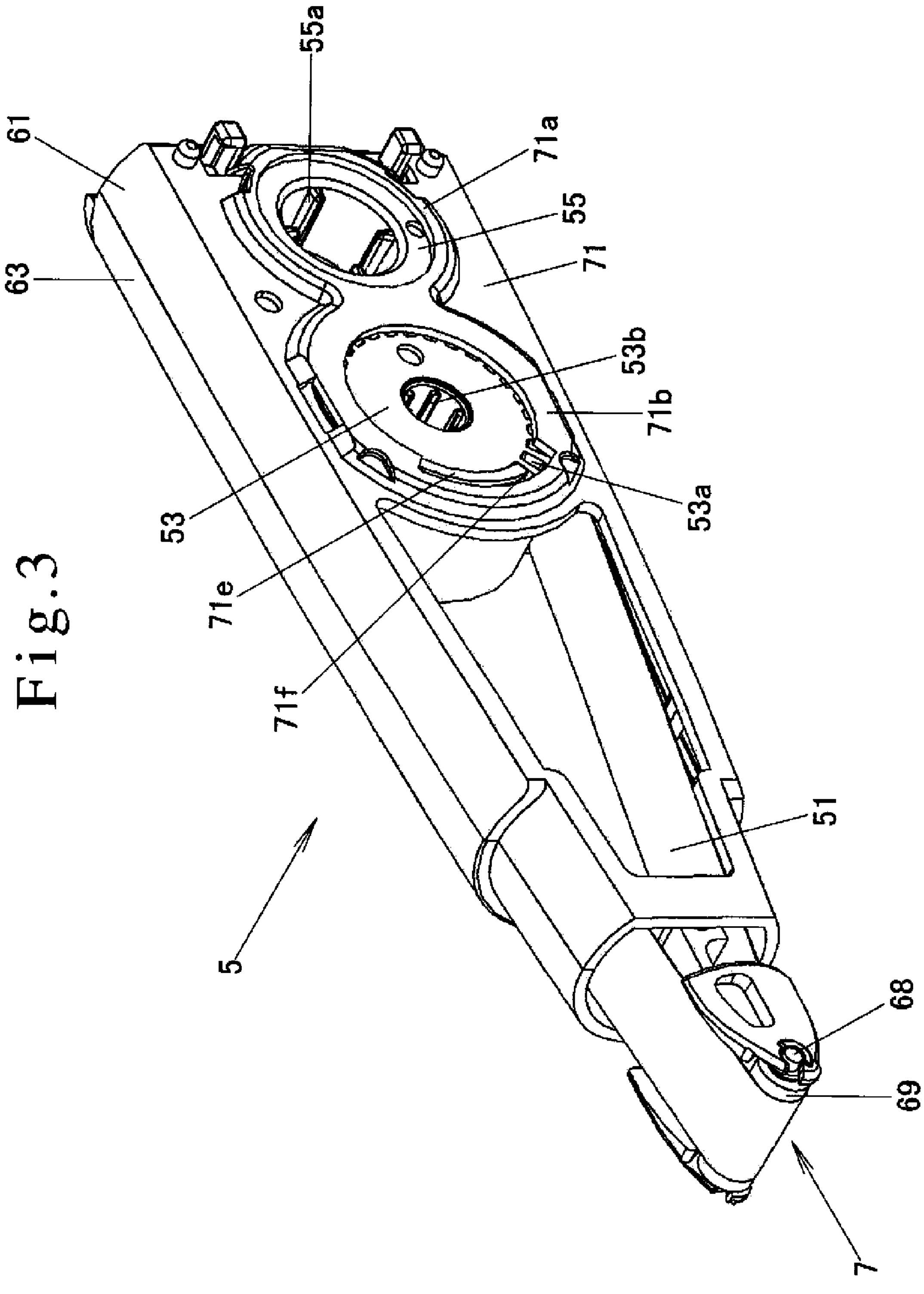
FIG. 3 is a perspective view illustrating the refill and the main body of the application-film transfer tool according to an embodiment of the present invention.

As illustrated in FIGS. 2 and 3, the replaceable refill 5 includes the transfer tape 51, the supply bobbin 53, the transfer head 7, the take-up bobbin 55, and the refill case accommodating these components. The refill case is attachable to and detachable from the main body 3 and includes a placement case 61 accommodating the supply bobbin 53 and the take-up bobbin 55 and a cover case 63 including the transfer head 7.

The supply bobbin 53 has a shape in which discs are attached to the top and bottom edges of a cylinder. The supply bobbin 53 supplies the unused transfer tape 51, which is wound around the supply bobbin 53, to the transfer head 7. On the inner surface of this cylinder, protrusions 53*b* that engage with the shaft of the clutching member 29 attached to the main body 3 are provided.

The take-up bobbin 55 takes up the used transfer tape 51 (base tape) and, similar to the supply bobbin 53, has a shape in which discs are attached to the top and bottom edges of a cylinder and, on the inner surface of this cylinder, has protrusions 55*a* that engage with the shaft of the take-up-side gear 28 attached to the main body 3. The diameter of the cylinder of the take-up bobbin 55 is larger than the diameter of the cylinder of the supply bobbin 53.

In the transfer head 7, a shaft 68 is passed through the front end section of the refill 5, and a tube 69 is rotatably supported on the shaft 68. The transfer tape 51 is extended around the transfer head 7. Thus, the application film of the transfer tape 51 can be pressure-sensitively transferred onto a transfer subject by a user moving the transfer head 7 while pressing it onto the transfer subject, such as paper.

As illustrated in FIG. 2. the main body 3 includes the base member 11 having the back securing member 31 holding the back section of the refill 5 and the front securing member 13 holding the front section of the refill 5. In this way, as illustrated in FIG. 2, on the application-film transfer tool I, the refill 5 can be loaded at a predetermined position on the main body 3 and secured by the front securing member 13 and the back securing member 31 of the base member 11 through separating the base member 11 of the main body 3 and the front securing member 13, placing the refill 5 on the base member 11, and, in this state, closely connecting the base member 11 of the main body 3 and the front securing member.

Figure 4:
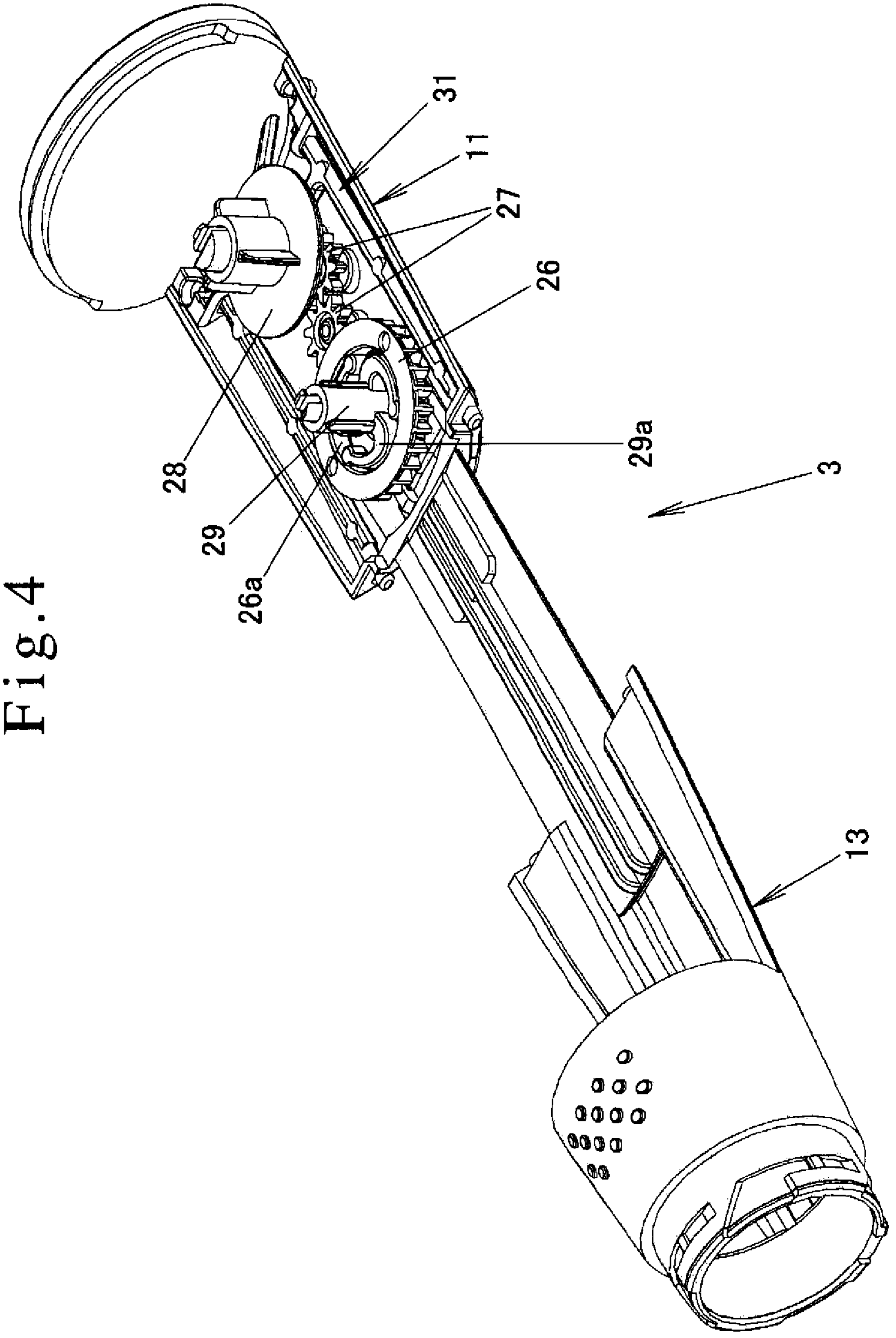
FIG. 4 is a perspective view of the main body of the application-film transfer tool according to an embodiment of the present invention.

As illustrated in FIG. 4, on the base member 11; there are disposed the clutch mechanism, the supply-side gear 26, which receives the rotational force of the supply bobbin 53 via the clutch mechanism, the take-up-side gear 28, which transfers the rotational force to the take-up bobbin 55, and the interlocking means for interlocking the supply-side gear 26 and the take-up-side gear 28.

The supply-side gear 26 is shaped as a disc having teeth on the outer surface and, on the upper surface, includes the circular depression 26*a* in which the resilient arms 29*a* of the clutching member 29 are disposed. The supply-side gear 26 is rotatably supported at the front section of the base member 11.

The clutch mechanism includes the clutching member 29 and the supply-side gear 26. The clutching member 29 includes the cylindrical shaft and the three resilient arms 29*a* provided on the side surface of the shaft near the bottom edge. The protrusions that engage with the supply bobbin 53 are provided on the side surface of the shaft, and the projections that contact the inner circumferential surface of the circular depression 26*a* are provided at the tips of the resilient arms 29*a*.

The clutching member 29 is rotatably supported concentrically with the supply-side gear 26 while the projections of the resilient arms 29*a* are engaged with the inner circumferential surface of the circular depression 26*a*of the supply-side gear 26 such that the protrusions of the resilient arms 29*a* apply a predetermined force in outward directions (directions orthogonal to the circumference, i.e., radial directions). In other words, the clutch mechanism functions as a friction clutch in which the projections of the resilient arms 29*a* contact the inner circumferential surface of the circular depression 26*a*.

The take-up-side gear 28 includes a cylindrical shaft, a disc provided at the bottom edge of the shaft, and a gear (not shown) provided below the disc. Protrusions that engage with the take-up bobbin 55 are provided on the side surface of the shaft. The take-up-side gear 28 is rotatably supported on a shaft vertically erected from near the back end of the base member 11. To maintain the tension of the transfer tape 51 above a predetermined value, the diameter of the take-up-side gear 28 according to this embodiment is smaller than the diameter of the supply-side gear 26.

The interlocking means for interlocking the supply-side gear 26 and the take-up-side gear 28 includes the two intermediate flat gears 27 that are rotatably supported between the supply-side gear 26 and the take-up-side gear 28 such that one of the intermediate flat gears 27 engages with the suppylv-side gear 26. and the other of the intermediate flat gears 27 engages with the take-up-side gear 28.

Accordingly, when a user moves the application-film transfer tool 1 while the transfer head 7 around which the transfer tape 51 is extended is pressed against the transfer subject, the supply bobbin 53 rotates by the transfer tape 51 being reeled out. When the supply bobbin 53 rotates, the clutching member 29 connected to the supply bobbin 53 rotates together.

When the clutching member 29 rotates, the supply-side gear 26 rotates by the frictional force generated at the projections on the tips of the resilient arms 29*a* of the clutching member 29 and the inner surface of the circular depression 26*a* of the supply-side gear 26, which contacts the projections. When the supply-side gear 26 rotates, the rotational force is transmitted to the take-up-side gear 28 via the intermediate flat gears 27, and, as a result, the take-up-side gear 28 rotates.

At this time, since the supply-side gear 26 and the take-up-side gear 28 rotate at a predetermined rotation ratio such that the rotational speed of the take-up-side gear 28 is greater than the rotational speed of the supply-side gear 26, when the supply bobbin 53 rotates in a normal direction, tension greater than a predetermined value is constantly applied to the transfer tape 51. When the tension of the transfer tape 51 becomes greater than a certain value, the clutching member 29 slides on the inner circumferential surface of the circular, depression 26*a*, and thus, the tension of the transfer tape 51 is prevented from increasing too much. That is, the clutch mechanism transmits the rotation of the supply bobbin 53 to the take-up bobbin 55, as well as, controlling the rotational speed of the take-up bobbin 55.

Next, the reverse-rotation prevention mechanism of the application-film transfer tool 1 according to this embodiment will be described. The reverse-rotation prevention mechanism prevents reverse rotation of the supply bobbin 53 to prevent sagging of the transfer tape 51 wound around the supply bobbin 53 and the take-up bobbin 55 and to prevent tangling of the transfer tape 51 inside the refill case.

As illustrated in FIG. 3, the reverse-rotation prevention mechanism includes the plurality of latching grooves 53*a* provided along the circumference of the supply bobbin 53 and the resilient deformable latching arm 71*e* provided on the refill 5. In other words, part of the supply bobbin 53 constitutes part of the reverse-rotation prevention mechanism. The reverse-rotation prevention mechanism is accommodated in the refill case, which is attachable to and detachable from the main body 3. The latching grooves 53*a* are rectangular through-holes formed along the circumference at equal intervals. It is desirable to make the intervals of the through-hole as small as possible.

Figure 5:
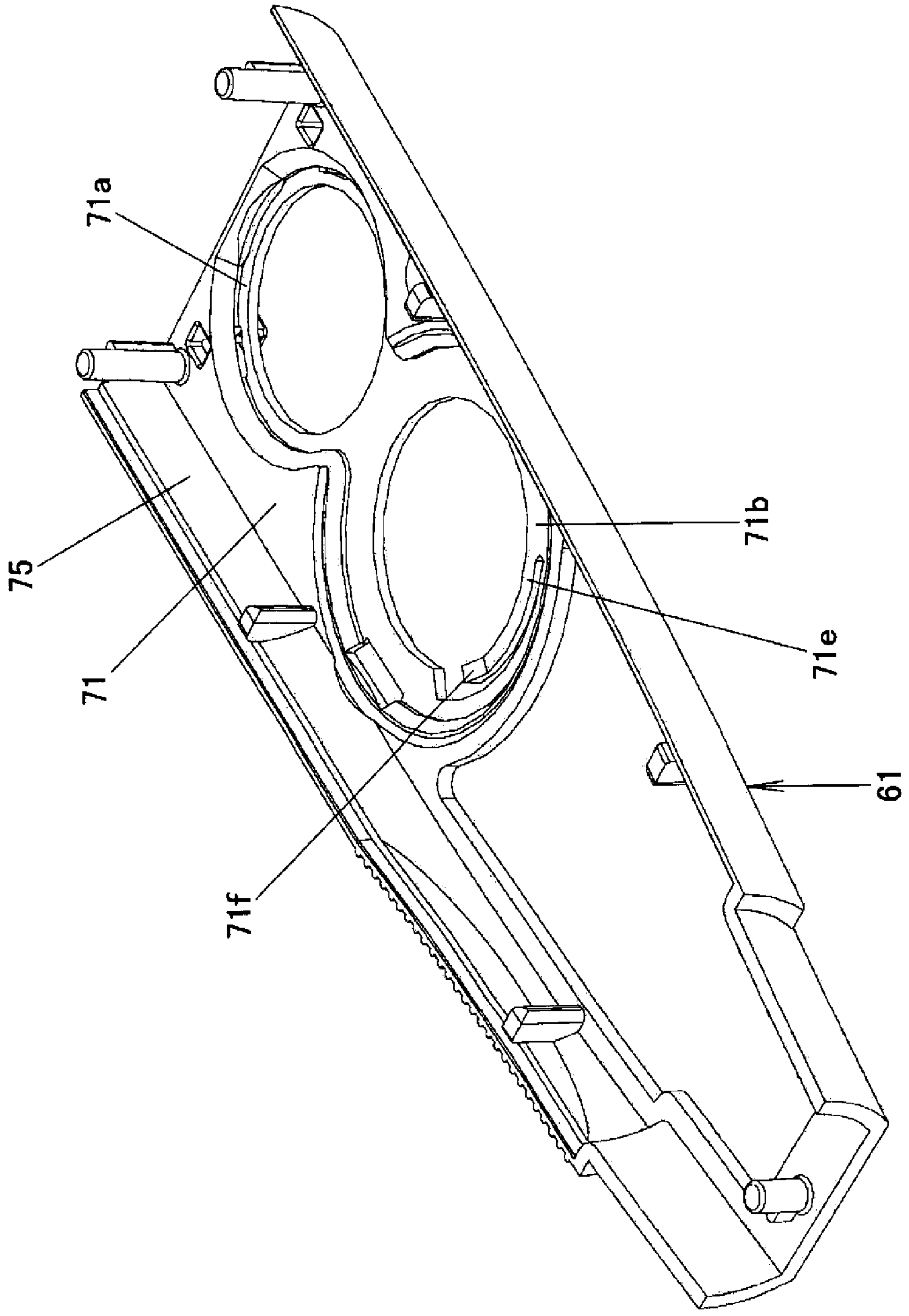
FIG. 5 is a perspective view of a placement case of the refill of the application-film transfer tool according to an embodiment of the present invention.

The latching arm 71*e* is provided on a placement face plate 71 of the placement case 61 of the refill 5. FIG. 5 is a perspective view of the placement case 61, which accommodates the supply bobbin 53 and the take-up bobbin 55. As illustrated, the placement case 61, in which the back edge is longer than the front edge, includes the substantially trapezoidal placement face plate 71 extending in the front-to-back direction and sidewalls 75 vertically erecting from both sides of the placement face plate 71. The placement face plate 71 has a circular take-up-bobbin placing part 71*a* where the take-up bobbin 55 is placed near the back end and a circular supply-bobbin placing part 71*b* where the supply bobbin 53 is placed in front of the take-up-bobbin placing part 71*a*. The take-up-bobbin placing part 71*a* and the supply-bobbin placing part 71*b* are circular depressions that protrude slightly downward from the placement face plate 71, and the centers of the placing parts 71*a* and 71*b* have circular openings.

The latching arm 71*e*, which latches together with the latching grooves 53*a* of the supply bobbin 53 when the supply bobbin 53 rotates in the reverse direction, is provided along the circumference of the opening of the supply-bobbin placing part 71*b*. The latching arm 71*e*, which is provided on the placement case 61 of the refill 5, is cantilevered at a predetermined position in such a manner that it extends along the circumference of the supply-bobbin placing part 71*b* and is resiliently deformable in the top-to-bottom direction. At the tip of the latching arm 71*e*, a latching hook 71*f* that latches together with the latching grooves 53*a* of the supply bobbin 53 is provided. At the tip of this latching hook 71*f*, a tapered part that allows rotation of the supply bobbin 53 in the right direction, which is the normal direction, is provided.

Figure 6:
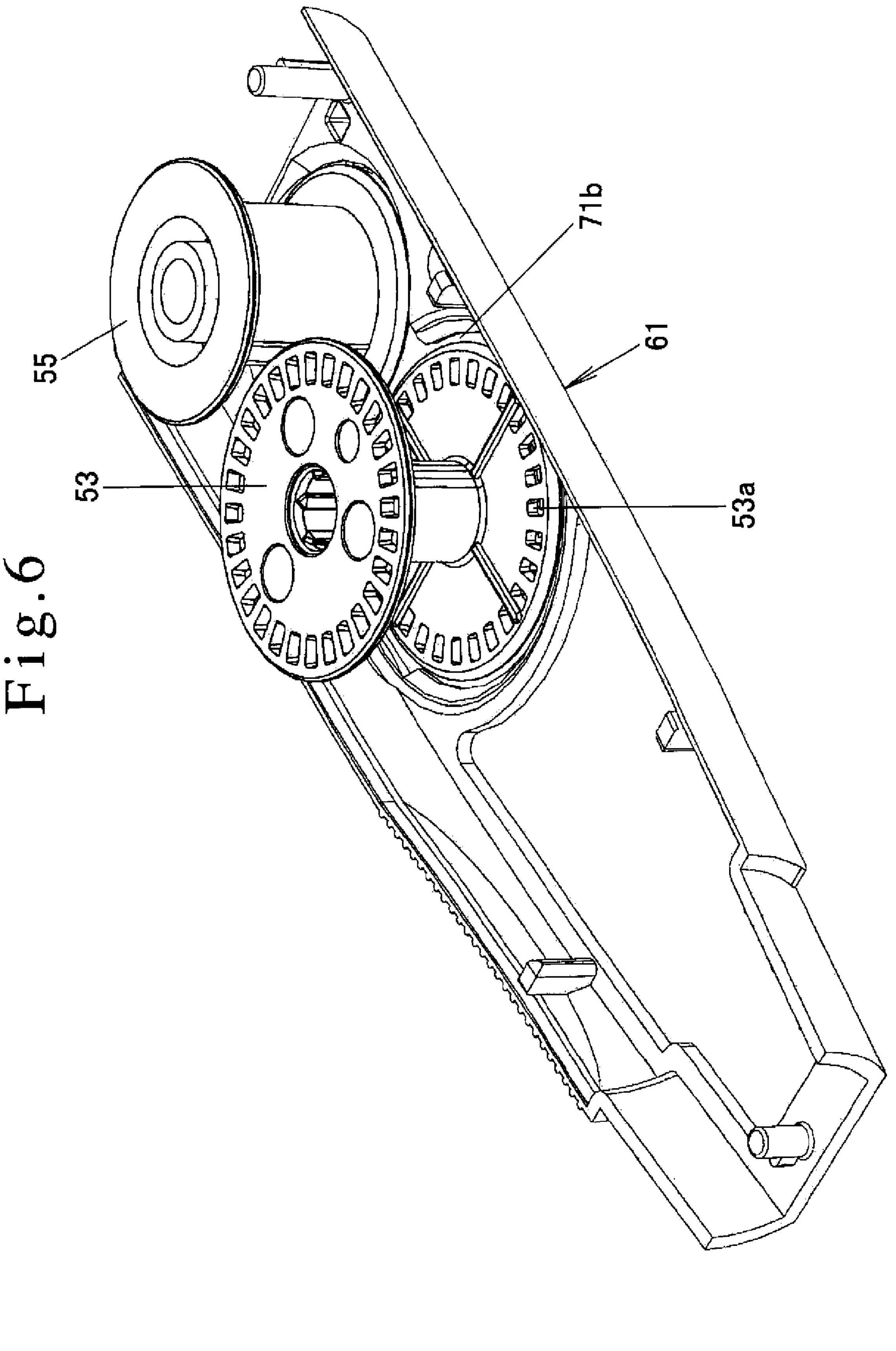
FIG. 6 is a perspective view illustrating the placement case of the refill of the application-film transfer tool according to an embodiment of the present invention accommodating a supply bobbin and a take-up bobbin.

As illustrated in FIG. 6, the supply bobbin 53 is placed on the supply-bobbin placing part 71*b* of the placement case 61 such that the latching grooves 53*a* and the latching hook 71*f* (see FIG. 5) of the placement case 61 contact each other. In this way, when a rotational force is applied to the supply bobbin 53 in the right direction, which is the normal direction, a predetermined load is applied to the supply bobbin 53 to allow the supply bobbin 53 to rotate in the normal direction. When a rotational force is applied to the supply bobbin 53 in the left direction, which is the reverse direction, the latching hook 71*f* of the latching arm 71*e* and one of the latching grooves 53*a* of the supply bobbin 53 engage to prevent the supply bobbin 53 from rotating in the reverse direction.

Figure 7:
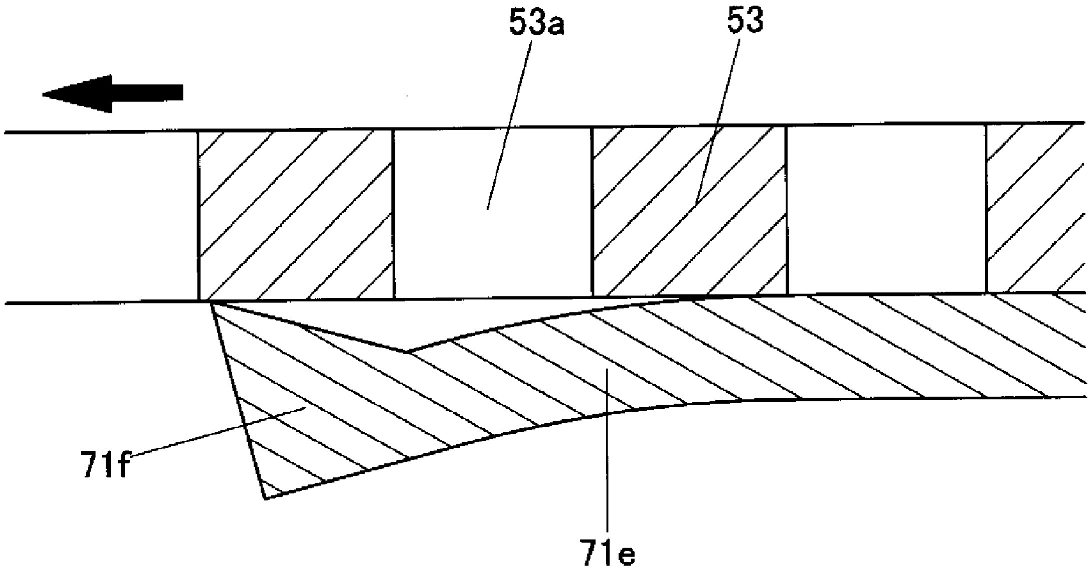
FIGS. 7A and 7B illustrate the operation of a reverse-rotation prevention mechanism of the application-film transfer tool according to an embodiment of the present invention.
Figure 7:
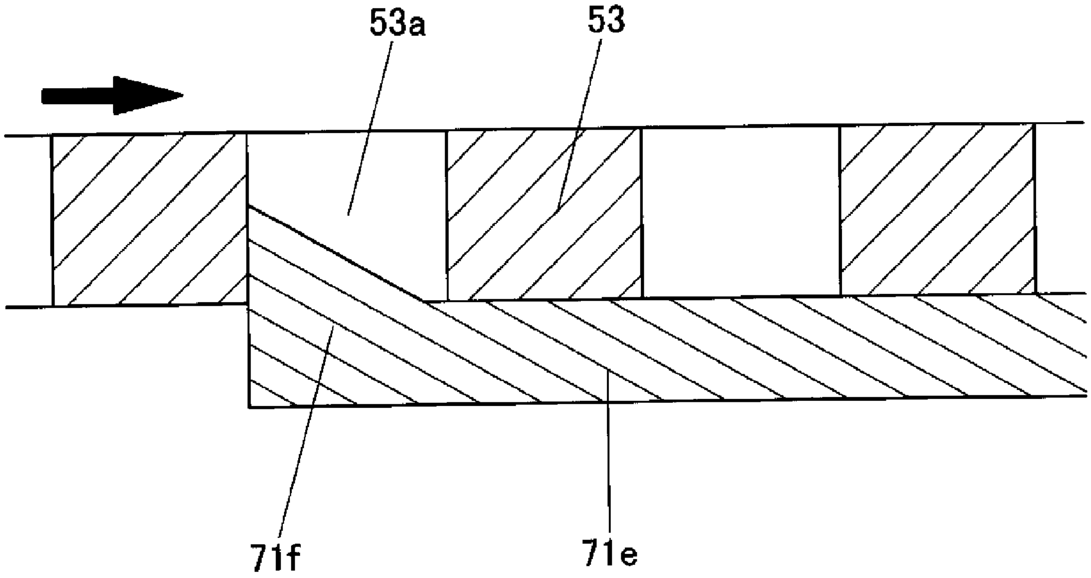

Specifically, when the supply bobbin 53 rotates in the normal direction, as illustrated in FIG. 7A, the latching groove 53*a* and the latching hook 71*f* of the placement case 61 engage. However, since a tapered part is provided at the tip of the latching hook 71*f*, when the tapered part and the latching groove 53*a* or the bottom surface of the supply bobbin 53, which is exposed between the latching grooves 53*a*, engage, the resilient latching arm 71*e* bends downward. In other words, the supply bobbin 53 can rotates while the latching arm 71*e* is repeatedly bending downward by the rotation of the supply bobbin 33.

In this way, since the latching hook 71*f* and the latching grooves 53*a* repeatedly engage while the supply bobbin 53 is rotating in the normal direction, a predetermined load is directly applied to the supply bobbin 53 while it rotates in the normal direction. However, since the reverse-rotation prevention mechanism is directly provided on the supply bobbin 53, the user may notice a slight resistance by the reverse-rotation prevention mechanism, but a mechanical loss will not be generated in the driving transmission system.

On the other hand, when a force in the direction that will cause the supply bobbin 53 to rotate in the reverse direction is applied, as illustrated in FIG. 7B, the end surface of the latching hook 71*f* contacts the inner surface of one of the latching grooves 53*a*, and the rotation of the supply bobbin 53 is stopped. In this way, reverse rotation of the supply bobbin 53 is reliably prevented, and sagging of the transfer tape 51 wound around the supply bobbin 53 and the take-up bobbin 55 and tangling of the transfer tape 51 inside the refill case are prevented.

Since the reverse-rotation prevention mechanism includes the latching grooves 33*a* of the supply bobbin 53 and the latching arm 71*e* of the placement case 61, mechanical loss of the driving transmission system caused by providing a reverse-rotation prevention mechanism according to the related art on the supply-side gear 26 and the take-up-side gear 28 is eliminated, and a small application-film transfer tool 1 that reliably rotates the take-up bobbin 55 by transmitting a driving force can be provided even when the diameter of the winding cores are small and the frictional force of the clutch mechanism is small.

Since the reverse-rotation prevention mechanism is provided inside the refill case, the reverse-rotation prevention mechanism is also replaced when the transfer tape 51 is replaced. In this way, an application-film transfer tool 1 in which the main body 3 can be used for a long period of time is provided.

The present invention is not limited to the embodiment described above, and modification may be made within the scope of the invention. For example, the reverse-rotation prevention mechanism is not limited to the embodiment described above, and, instead, the latching grooves 53*a* may be provided on the refill case, and the latching arm 71*e* may be provided on the supply bobbin 53. Moreover, the latching grooves 53*a* may not be through-holes and, instead, may be a ratchet gear. Furthermore, the latching arm 71*e* may be provided on the supply-bobbin placing part 71*b*, and the latching grooves 53_a_ may be provided on the outer circumferential surface of the lower disc of the supply bobbin 53. That is, various configurations may be applied to the reverse-rotation prevention mechanism in which part of the reverse-rotation prevention mechanism is provided on the supply bobbin 53.

What is claimed is:

1. An application film transfer tool comprising, a) a supply bobbin around which an unused transfer tape is wound, the supply bobbin having a circular periphery and a first axis of rotation;

b) a transfer head around which the transfer tape is extended, the transfer head pressure-sensitively transferring an application film of the transfer tape onto a transfer subject by pressing against the transfer subject;

c) a take-up bobbin taking up the used transfer tape, the take-up bobbin having a second axis of rotation parallel to the first axis of rotation;

d) a clutch mechanism engaged with the supply bobbin and the take-up bobbin for transmitting rotation of the supply bobbin to the take-up bobbin and controlling rotational speed of the take-up bobbin; and e) a reverse rotation prevention mechanism for preventing reverse rotation of the supply bobbin, said reverse rotation mechanism having engageable latching components including latching grooves and a latching protrusion engageable in the latching grooves such that engagement of the latching components permits rotation of the supply bobbin in one direction and prevents rotation of the supply bobbin in a direction opposite the one direction, one of the engageable latching components being provided on the supply bobbin for rotation with the supply bobbin and the other latching component being non-rotatable, the latching components being confined within the circular periphery of the supply bobbin and being engageable in a direction parallel to the first the axis of rotation of said supply bobbin, wherein part of the supply bobbin constitutes part of the reverse rotation prevention mechanism.

2. The application-film transfer tool according to claim 1, wherein the supply bobbin, the transfer head, and the take-up bobbin are accommodated in a refill case that is attachable to and detachable from a main body, and wherein the reverse-rotation prevention mechanism is accommodated in the refill case.

3. The application-film transfer tool according to claim 2, wherein plurality of latching grooves are provided along the circumference of the supply bobbin and the latching protrusion is located on a resilient deformable latching arm provided on the refill case.

4. The application-film transfer tool according to claim 2, wherein the main body to and from which the refill case is attachable and detachable includes the clutch mechanism, a supply-side gear receiving a rotational force of the supply bobbin via the clutch mechanism, a take-up-side gear transmitting the rotational force to the take-up bobbin, and a base member having interlocking means for interlocking the supply-side gear and the take-up-side gear.

5. The application-film transfer tool according to claim 3, wherein the main body to and from which the refill case is attachable and detachable includes the clutch mechanism, a supply-side gear receiving a rotational force of the supply bobbin via the clutch mechanism, a take-up-side gear transmitting the rotational force to the take-up bobbin, and a base member having interlocking means for interlocking the supply-side gear and the take-up-side gear.

* * * * *

UNITED STATES PATENT AND TRADEMARK OFFICE

CERTIFICATE OF CORRECTION

PATENT NO. : 8,347,933 B2
APPLICATION NO. : 12/906677
DATED : January 8, 2013
INVENTOR(S) : Yasuo Narita It is certified that error appears in the above-identified patent and that said Letters Patent is hereby corrected as shown below:

In the Specifications
Column 4,
Line 47, change "refill 3" to --refill 5--

Column 4,
Line 52, after "tool" insert --1--

Column 4,
Line 56, change "ease" to --case--

Column 5,
Line 58, change "Fig. 2" to --Fig. 4--

Column 6,
Line 2, after "securing member" insert --13--

Column 6,
Line 50, change "supplylv" to --supply--

Column 8,
Line 42, change "33a" to --53a--

In the Claims
Column 10,
Line 3, change "the axis" to --axis--

Column 10,
Line 13, after "wherein" insert --the--

Signed and Sealed this
Twenty-eighth Day of May, 2013

Teresa Stanek Rea
*Acting Director of the United States Patent and Trademark Office*